Jan. 23, 1945.  E. SCHWARTZ  2,367,967
ANIMATED PICTURE DEVICE
Filed Nov. 18, 1942
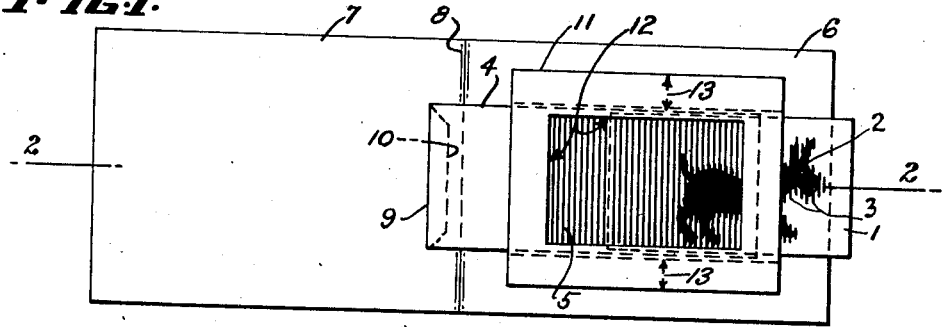
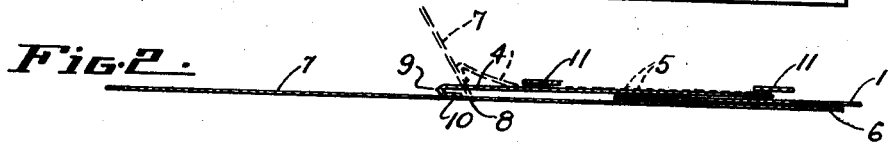
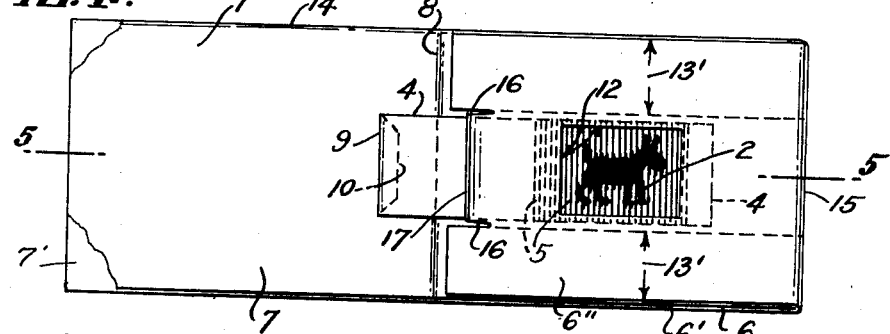
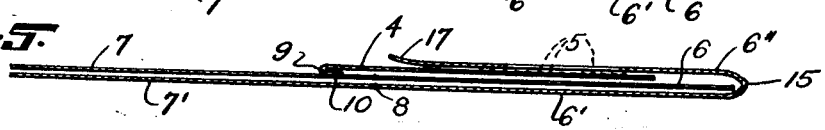
INVENTOR.
EDWARD SCHWARTZ
BY
ATTORNEY.

Patented Jan. 23, 1945

2,367,967

UNITED STATES PATENT OFFICE 2,367,967

ANIMATED PICTURE DEVICE

Edward Schwartz, Hollywood, Calif.

Application November 18, 1942, Serial No. 466,043

3 Claims. (Cl. 40—65)

This invention relates to the type of picture having portions of it printed in spaced lines which cooperate with similarly spaced lines on a thin transparent sheet which covers the picture and is slid back and forth upon the picture transversely of the lines and whereby an animated appearance to the picture as seen through the ruled transparent slider or "screen" is produced.

The object of the present invention is to provide an improved mounting for a picture of this kind in the nature of a greeting card folder or booklet, which will automatically move the transparent slider in relation to the picture as the folder is being opened or closed. More specially the object of the invention is to provide a folder mounting for such a picture in which the mount is folded to cover the picture and the screen or picture is hingedly connected to one part of the mount so as to slide with a parallel motion with respect to and adjacent the other part of the mount which carries the picture or screen, as the case may be when the folder is opened to reveal the picture, and this insures a guided motion of the movable portion of the picture at right angles to the ruled lines of the screen while also preventing detachment or loss of the screen.

Another object is to provide such a mounting as above described which may be assembled in book form so that the opening of one page will operate the picture on the next page, and so on.

Another object is to provide such a mounting as above described which will provide for easy changing of or inserting different pictures beneath the screen.

Other features and advantages of the invention will appear in the following description and accompanying drawing.

In the drawing—

Fig. 1 is a plan view of a simple two-leaf type greeting card or paper folder with a cut-out on the right-hand page fitted with an animated picture of the type described, and operated by a hinged connection of the slider or screen to the opening flap or cover leaf of the folder.

Fig. 2 is longitudinal section of Fig. 1 as seen along the line 2—2 thereof.

Fig. 3 is a view like that of Fig. 2 but shows the picture hingedly connected to the folder flap instead of the screen.

Fig. 4 is a plan view like that of Fig. 1 but shows a "greeting card" style of multi-leaf paper folder with a cut-out in one leaf and with the animated picture displayed within it and operated by a hinged connection of the screen to the opposite or covering leaf.

Fig. 5 is a longitudinal section of Fig. 4 as seen from the line 5—5 thereof.

Since the picture itself and its cooperating transparent sheet of ruled lines or screen are not claimed specifically in the present application, they will not be specifically described other than to point out their main features.

In Fig. 1, I is the card or paper sheet upon which the picture is printed or otherwise formed, and which in this instance is the picture of a dog 2 formed with a narrow fringe 3 of vertically ruled spaced lines 3 printed about the outline of the dog, so that when the transparent sheet 4 which is ruled with laterally spaced vertical lines 5 is in covering relation to the picture and moved slowly back and forth over it at right angles to the ruled lines and substantially in contact with the picture, the dog will appear animated, to a person viewing it through the screen.

As a mounting to normally enclose and cover the picture and provide the proper movement of the screen when the folder is opened I provide a folder card or heavy piece of paper which comprises two leaves or flaps 6, 7 scored or creased across it as at 8 so that the two leaves may be closed together like the covers of a book.

The screen sheet 4 is of thin transparent Celluloid, Cellophane, gelatine, or the like, with the spaced ruled lines 5 disposed on it over the area which normally covers the picture, but it is in the form of a strip considerably longer than the picture and extends from the face of the right-hand leaf 6 past the fold line 8 to the inner face of leaf 7 and is then creased as at 9 and bent back underneath as at 10 and pasted or otherwise secured to leaf 7 near fold 8. The crease or fold 9 functions as a hinge.

A paper cut-out frame 11 with an opening 12 of somewhat lesser width than the screen sheet, is positioned above the screen sheet and pasted or otherwise secured along its upper and lower margins 13 to the mount flap 6 so as to provide freedom for the screen sheet to slide back and forth under the frame and yet hold the screen sheet down flat upon the picture 2 which may be directly printed upon the flap 6 within the opening 12 of the cut-out frame 11, or may be printed on a separate piece of paper or thin card 1 as in the drawing and wherein the picture card is shown pulled out about half way, tho in use the picture is of course pushed in until it is all seen through the opening in the cut-out. The object of using the cut-out frame is to better hold the screen sheet snugly tho slidably against the face of the picture.

While the arrangement described provides for changing the pictures, it is manifest there may also be one printed or attached directly on the mount 6 within the frame opening.

In considering the structure of Fig. 1 as above described, it will be evident that as the screen sheet is hingedly connected at 9 to the outer leaf 7 of the folder, and at a point relatively close to its fold line 8 or hinged connection of the two leaves, that as leaf 7 is lifted toward folding position it will move the screen strip toward the right, and in the opposite direction when opened again, to thus pass the vertical ruled lines of the screen across the face of the specially printed picture 2, to thereby give it the semblance of motion. Thus, if the leaf 7 is swung back as in opening the folder to see the picture, and slightly on its hinge joint 8 when open the slider or screen will automatically move back and forth slightly, but sufficiently for the purpose.

In Fig. 2 an attempt is made to show the relation of the parts, but as the transparent film screen sheet 4, and paper frame 11, and picture sheet 1 are all actually thinner than a single ink line, the distortion in thickness required by the Patent Office rules to show these members in the drawing as having a tangible cross hatched body make the showing of Fig. 2 clumsy, but as the parts are numbered the action above set out will be understood, as well as the fact that the folder leaves 6 and 7 may be folded flat together like a book with the other members all flat between them.

In Fig. 3 the construction is substantially the same as in Fig. 2 with parts similarly numbered, except that it is the picture sheet 1' which is slidable under the screen sheet 4 and which screen sheet is fixed in place so that the picture strip may slide back and forth under it, and hence the screen sheet may simply be pasted to the under side of the frame 11, or the frame entirely omitted and the screen sheet made the same size as the omitted frame sheet and similarly pasted along its upper and lower margin directly to mount flap 6 as described for Fig. 1. In this showing the picture sheet 1' is made elongated to the size of the screen sheet 4 of Fig. 1 and similarly creased at the left-hand end as at 9' to provide a hinge joint connection to folder leaf 7 then bent under as at 10' and pasted to the leaf as described for the screen attachment of Fig. 1.

In the modification of Fig. 4 the use of a paper folder of several layers for the mount as with the usual paper folder greeting "cards" is shown. In this view the folder is a piece of paper doubled over along the line 14, then doubled or folded again at right angles along the line 8 to form leaves 6, 6', 7, 7', and an extension 6'' of 6' is folded or doubled over along the line 15 and preferably pasted along its upper and lower margins 13' to leaf 6 and provided with the cut-out 12 for the picture 2. Thus the outer leaf 6'' becomes the frame 11 of Fig. 1. The screen strip 4 is attached to leaf 7 as described for Fig. 1, but leaf 6'' is preferably slotted at the left-hand edge as at 16 to provide a tongue portion 17 to better guide the thin screen strip to and from below sheet 6''.

Fig. 5 is a longitudinal cross section showing the various leaves to clarify their relation as described, and in Fig. 4 the under edges of the leaves have been shown successively extending at the lower edge of the folder for easier understanding only. In this multiple leaf folder construction, since 4 is the screen strip, the picture 2 is printed (or pasted) to leaf 6 immediately below the cut-out 12 in leaf 6.

From the above several variations of my invention it will be evident to one skilled in the art that still other variations in details of construction may be incorporated within the spirit of the invention and appended claims.

I therefore claim:

1. An animated picture device comprising a folder having at least two leaves hingedly connected to open like a book, a composite picture member and a transparent screen member having spaced opaque stripes thereon overlying the picture member arranged on the inner face of one of said leaves, and with one of the members secured to said inner face, and the other member being slidably arranged and elongated to extend upon the inner face of the other leaf and there hingedly secured so as to cause it to slide across the other member as the folder is opened to reveal the picture, and a cut-out frame for the picture overlying both members and secured at its margin to the leaf below it while preserving the elongated member free to slide, said cut-out frame formed of an extension of one leaf constituting an additional leaf of the folder doubled over upon the members on the first mentioned inner face of the leaf.

2. An animated picture device comprising a folder having at least two leaves hingedly connected to open like a book, a picture member and a transparent screen member overlying the picture arranged on the inner face of one of said leaves, and with one of the members secured to said inner face, and the other member being slidably arranged and elongated to extend upon the inner face of the other leaf and there hingedly secured so as to cause it to slide across the other member as the folder is opened to reveal the picture, and a cut-out frame for the picture overlying both members and secured at its margin to the leaf below it while preserving the elongated member free to slide, said cut-out frame adjacent the hinged connection of the leaves being notched to pass the elongated slidable member and formed with a resilient tongue overlying the member.

3. An animated picture device comprising a folder having at least two leaves hingedly connected at one edge to open like a book, a picture on the inner face of one of said leaves, a thin flexible transparent screen sheet slidably overlying the picture, said screen sheet being elongated to extend partly over and upon the inner face of the other leaf and provided at its extreme end with a hinged flap secured to said inner face of said other leaf in a manner to cause the screen sheet to slide upon the picture as the folder is opened to reveal the picture, and a cut-out frame for the picture overlying the screen sheet and secured at its margin to the leaf below it while preserving the screen sheet free to slide, said cut-out frame formed of an extension of one leaf constituting an additional leaf of the folder doubled over upon the screen and picture.

EDWARD SCHWARTZ.